United States Patent
Evans (10) Patent No.: US 7,217,387 B2
(45) Date of Patent: May 15, 2007

(54) METHOD OF PRODUCING TIGHT BEZEL FITS BETWEEN AUTOMOTIVE INTERIOR PANELS AND THEIR MATING SUBCOMPONENTS

(75) Inventor: Gregg S. Evans, Windsor (CA)

(73) Assignee: Intertec Systems, Troy, MI (US)

( * ) Notice: Subject to any disclaimer, the term of this patent is extended or adjusted under 35 U.S.C. 154(b) by 33 days.

(21) Appl. No.: 11/041,289

(22) Filed: Jan. 25, 2005

(65) Prior Publication Data

US 2005/0161143 A1 Jul. 28, 2005

Related U.S. Application Data

(60) Provisional application No. 60/563,461, filed on Apr. 20, 2004, now abandoned, provisional application No. 60/538,477, filed on Jan. 26, 2004, now abandoned.

(51) Int. Cl.
*B29C 51/10* (2006.01)
*B29C 51/14* (2006.01)

(52) U.S. Cl. ............... 264/510; 264/553; 264/154; 264/155; 264/250; 264/293; 264/296

(58) Field of Classification Search .................. None
See application file for complete search history.

(56) References Cited

U.S. PATENT DOCUMENTS

| | | | |
|---|---|---|---|
| 4,105,246 A | 8/1978 | Trumbull | |
| 4,462,564 A | 7/1984 | Alves et al. | |
| 4,667,979 A | 5/1987 | Wolff | |
| 4,824,714 A | 4/1989 | Gest | |
| 4,943,107 A | 7/1990 | Rhodes, Jr. | |
| 4,948,074 A | 8/1990 | Bramhall, Jr. | |
| 4,952,351 A * | 8/1990 | Parker et al. | 264/46.4 |
| 5,043,114 A * | 8/1991 | Saito et al. | 264/46.6 |
| 5,294,164 A | 3/1994 | Shimabara et al. | |
| 5,479,693 A | 1/1996 | Oyama | |
| 5,492,663 A * | 2/1996 | Greenwald et al. | 264/154 |
| 5,962,089 A * | 10/1999 | Jones et al. | 428/31 |
| 6,056,531 A * | 5/2000 | Furuya et al. | 425/302.1 |
| 6,354,649 B1 | 3/2002 | Lee | |
| 6,517,139 B2 | 2/2003 | Sutou et al. | |

(Continued)

FOREIGN PATENT DOCUMENTS

DE 19812832 9/1999

(Continued)

*Primary Examiner*—Edmund H. Lee
(74) *Attorney, Agent, or Firm*—Dykema Gossett PLLC (57) ABSTRACT

A method of producing tight bezel fits between automotive interior panels and their mating subcomponents. The method includes forming at laminate preform, injection molding a substrate layer behind the laminate preform to form a molded automotive interior panel, and forming an opening in the molded automotive interior panel. The method further includes post embossing the molded automotive interior panel adjacent a perimeter of the opening to produce an embossed interface between the molded automotive interior panel and a mating subcomponent installed in the opening, thereby producing a tight bezel fit between the molded automotive interior panel and the mating subcomponent installed in the opening. Alternatively, the method includes utilizing a vacuum wrapped automotive interior panel with the embossing step described above. The invention also provides for an automotive interior panel including a tight bezel fit between the panel and mating subcomponents, formed by the aforementioned methods.

8 Claims, 7 Drawing Sheets

U.S. PATENT DOCUMENTS

| | | |
|---|---|---|
| 2001/0030070 A1 | 10/2001 | Teranishi et al. |
| 2002/0094409 A1 | 7/2002 | Query et al. |

FOREIGN PATENT DOCUMENTS

| | | | |
|---|---|---|---|
| JP | 60236843 | | 11/1985 |
| JP | 61-158422 | * | 7/1986 |
| JP | 10225941 | | 8/1993 |
| JP | 10157489 | | 6/1998 |
| JP | 11078613 | | 3/1999 |
| JP | 2001-353758 | * | 12/2001 |

* cited by examiner

METHOD OF PRODUCING TIGHT BEZEL FITS BETWEEN AUTOMOTIVE INTERIOR PANELS AND THEIR MATING SUBCOMPONENTS

CROSS-REFERENCE TO RELATED APPLICATIONS

This application claims the benefit of U.S. Provisional Patent Application No. 60/538,477 filed Jan. 26, 2004, now abandoned, and 60/563,461 filed Apr. 20, 2004, now abandoned, hereby incorporated by reference in their entirety.

BACKGROUND OF INVENTION a. Field of Invention

The invention relates generally to automotive component manufacture and installation, and, more particularly to a method for producing tight bezel fits between automotive instrument panels and their surface mating subcomponents, and further to the same method as applied to automotive door inner liners (the interior show surface of an automotive door) and other structures requiring similar construction.

b. Description of Related Art

In the art, there presently exist a variety of methods, such as mold behind or vacuum wrapped technology, for manufacturing vehicle instrument panels and similar structures. Mold behind technology generally involves a single-step advanced injection-molding process that integrates cover materials to form the structure of automotive instrument panels, doors and the like. Vacuum wrapped technology, as discussed in detail in applicant's co-pending U.S. Application titled "Thermoforming of Ink Jet Printed Media for the Decoration of Soft Grained Automotive Interior Components," the disclosure of which is incorporated by reference, typically involves the wrapping of a substrate with heated thermoplastic (TP) bi-laminate sheet (most commonly consisting of a compact thermoplastic layer and a soft foam thermoplastic layer) for forming an automotive interior panel component, and evacuating the air from between the substrate and the sheet, such that atmospheric pressure pushes the sheet onto the mold, thereby stretching the sheet as required to form in three dimensions. An adhesive either on the substrate, or the bi-laminate sheet secures the wrapped layers to the structural substrate.

Regardless of whether mold behind or vacuum wrapped technology is employed, instrument panels constructed from such known technology have thus far been limited to large (i.e. >2.5 mm) radii and loose fit conditions. For example, referring to FIGS. 1–3, an instrument panel 10 including an object 12 (i.e. a side window defroster) mounted in gap 14 is illustrated. The geometry around instrument panel openings adjacent the edge mating surfaces of object 12 and instrument panel 10 at locations 16, 18 and 20, on injection mold behind foam laminate constructions and vacuum wrapped technology, has been thus far been severely limited (i.e. mating surface radii are typically >2.5 mm), thus greatly affecting fit and finish with the subcomponents. While such construction is acceptable for relatively inexpensive automobiles, for higher-end automobiles, a tighter fit construction (i.e. a mating surface radii between 0–0.5 mm) is required. Such fit requirements in higher-end automobiles have thus far required complex processes which add to the overall cost of the automobile due to the increased labor and manufacturing costs.

It would therefore be of benefit to provide an instrument panel construction method which achieves the fit constraints of higher-end automobiles, without significantly adding to the labor and manufacturing costs for such constructions in lower-end automobiles. It would also be of benefit to provide a construction method which is repeatable and readily usable for a variety of automobiles, and which produces an end-product which meets automotive safety and reliability criteria.

SUMMARY OF INVENTION

The invention solves the problems and overcomes the drawbacks and deficiencies of prior art mold behind and vacuum wrapped technology construction methods by providing a method for producing high quality instrument panels and other components having a tight fit construction (i.e. a mating surface radii between 0–0.5 mm) for installation of subcomponents, for example, side window defrosters, as well as air conditioning registers, speakers, windshield defrosters, navigation unit openings and the like.

The present invention thus provides a method of producing tight bezel fits between automotive interior panels and their mating subcomponents. The method includes forming at laminate preform (formed by vacuum forming), injection molding a substrate layer behind the laminate preform to form a molded automotive interior panel, and forming an opening in the molded automotive interior panel. The method further includes post (meaning after injection molding) embossing the molded automotive interior panel adjacent a perimeter of the opening to produce an embossed interface between the molded automotive interior panel and a mating subcomponent installed in the opening, thereby producing a tight bezel fit between the molded automotive interior panel and the mating subcomponent installed in the opening.

For the method described above, the laminate preform may be a multi-layer laminate preform, and include a skin layer and a foam layer. The molded automotive interior panel may include a sloped section adjacent the embossed interface to permit an outer surface of the mating subcomponent to lay flush relative to an outer surface of the molded automotive interior panel. The opening may be formed by punching or cutting, and the embossing tool may be a heated tool or an ultra-sonic tool. The embossing step provides an interface radius of less than approximately 0.5 mm. Further, for the embossing step, a gap between an edge of the embossed interface and the mating subcomponent installed in the opening may be less than approximately 0.125 mm.

For an alternative embodiment, the present invention provides a method of producing tight bezel fits between automotive interior panels and their mating subcomponents. The method includes vacuum wrapping over a substrate layer to form a vacuum wrapped automotive interior panel, and forming an opening in the vacuum wrapped automotive interior panel (thus producing a standard vacuum wrapped panel). The method further includes post (this being after the vacuum wrapping operation) embossing the vacuum wrapped automotive interior panel adjacent a perimeter of the opening to produce an embossed interface between the vacuum wrapped automotive interior panel and a mating subcomponent (examples would include air conditioning registers, side window defroster registers, speaker openings and grab handles) installed in the opening, thereby producing a tight bezel fit between the vacuum wrapped automotive interior panel and the mating subcomponent installed in the opening.

For the method described above, a wrap used for the vacuum wrapping may be a multi-layer laminate preform, and include a skin layer and a foam layer. The vacuum wrapped automotive interior panel may include a sloped section adjacent the embossed interface to permit an outer surface of the mating subcomponent to lay flush relative to an outer surface of the vacuum wrapped automotive interior panel (in particular it permits the desirable wedged bezel profile for its stiffness, while still allowing the component to lay flush with the panel surface). The opening may be formed by punching or cutting, and the embossing tool may be a heated tool or an ultra-sonic tool. The embossing step provides an interface radius of less than approximately 0.5 mm. Further, for the embossing step, a gap between an edge of the embossed interface and the mating subcomponent installed in the opening may be less than approximately 0.125 mm.

The invention yet further provides an automotive interior panel formed by injection molding or vacuum wrapping and including a tight bezel fit between the interior panel and mating subcomponents. The panel includes an opening formed in the interior panel, and an embossed section adjacent a perimeter of the opening defining an embossed interface between the interior panel and a mating subcomponent installed in the opening, such that when the mating subcomponent is installed in the opening, the interior panel includes a tight bezel fit between the panel and the mating subcomponent.

For the automotive interior panel described above, the panel may include a sloped section adjacent the embossed interface to permit an outer surface of the mating subcomponent to lay flush relative to an outer surface of the automotive interior panel. An interface radius adjacent the embossed interface may be less than approximately 0.5 mm, and a gap between an edge of the embossed interface and the mating subcomponent installed in the opening may be less than approximately 0.125 mm.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENT

Referring now to the drawings wherein like reference numerals designate corresponding parts throughout the several views, FIGS. 4–9 and 17–21 illustrate the manufacturing stages for producing an embossed opening according to first and second embodiments of the present invention (hereinafter generally referred to as 'embossed manufacturing method'), and FIGS. 10–16 illustrate exemplary features of an instrument panel constructed by means of the first and second embodiments of the embossed manufacturing methods of the present invention.

Figures 4, 5:
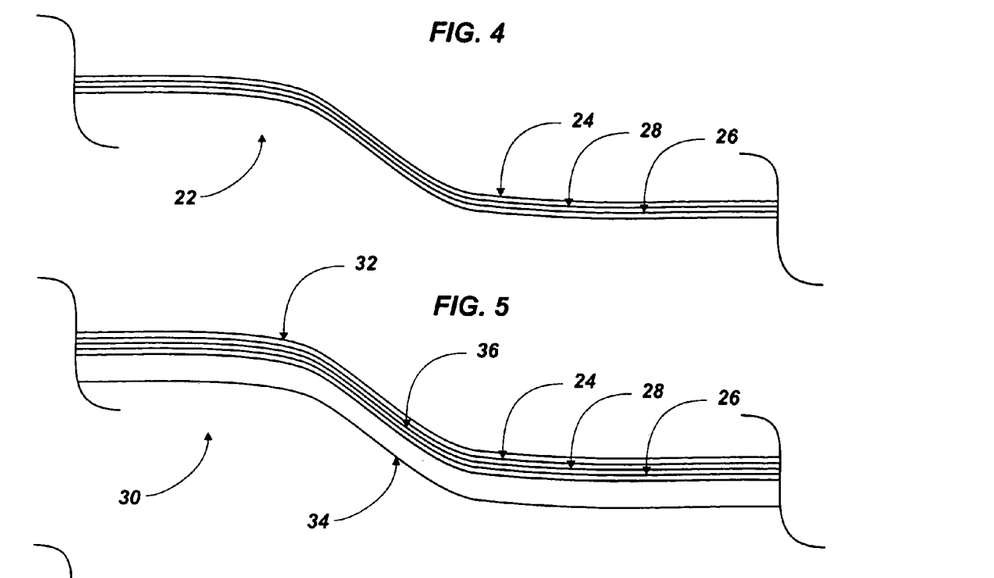
FIG. 4 is an illustrative view of a manufacturing stage for a first embodiment of the embossed manufacturing method according to the present invention, illustrating tri-laminate, and in alternative forms bi-laminate (sandwiched skin and foam, without the backing ply) preforms or expanded (single layer sheets with a non-porous surface and bubbles creating a foam within) preforms being used in otherwise the same fashion.
FIG. 5 is an illustrative view of a manufacturing stage for the first embodiment of the embossed manufacturing method according to the present invention, illustrating mold behind manufacturing in the injection tool.

Referring to FIGS. 4–7, the first embodiment of the embossed manufacturing method according to the present invention may use a bi-laminate or tri-laminate preform (illustrated in FIG. 4), or sheet construction. As shown in FIG. 4, the first step in the embossed manufacturing method, which employs the mold behind construction methodology, may include the use of a tri-laminate preform 22 including a top T.P.O. skin layer 24, a bottom backing layer 26, and a foam layer 28 sandwiched between layers 24, 26. Layers 24, 26 and 28 may have an exemplary thickness of 0.45 mm, 0.25 mm and 0.9 mm, respectively. For the construction illustrated in FIG. 4, the layers may not include any defined features to betray preform mislocation and foam rebound errors, and the slope angle minimizes bezel edge thinning.

Figure 6:
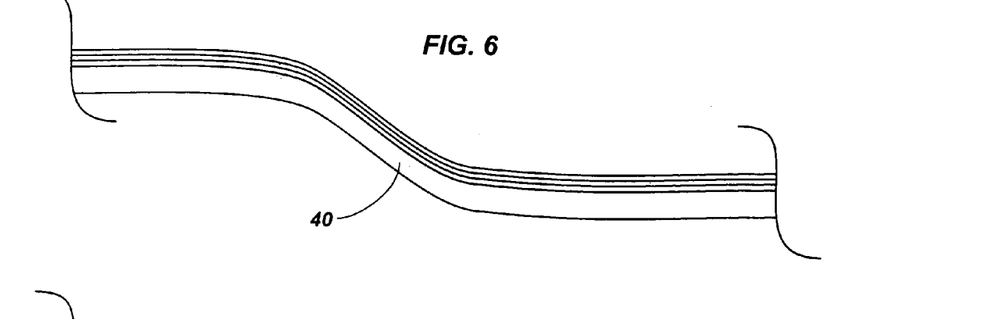
FIG. 6 is an illustrative view of a manufacturing stage for the first embodiment of the embossed manufacturing method according to the present invention, illustrating tri-laminate, and in alternative forms bi-laminate (sandwiched skin and foam, without the backing ply) preforms or expanded (single layer sheets with a non-porous surface and bubbles creating a foam within) preforms under injection pressure.
Figure 7:
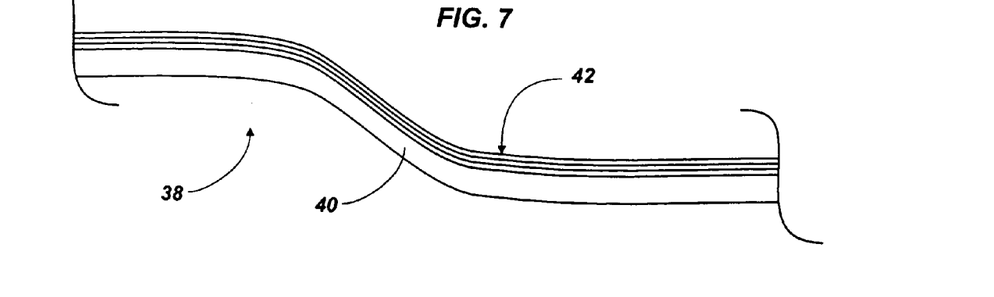
FIG. 7 is an illustrative view of a manufacturing stage for the first embodiment of the embossed manufacturing method according to the present invention, illustrating foam rebound.

As shown in FIG. 5, the exemplary tri-laminate preform may be placed in an injection tool cavity 30 including cavity top and bottom surfaces 32, 34, and include a bulge detail 36 which does not match the preform contour. Referring next to FIG. 6, under injection pressure in cavity 30, tri-laminate preform 22 and substrate 40 are compressed, and the bulge is formed in polypropylene (PP) layer 36. As shown in FIG. 7, after injection, foam layer 28 rebounds, and structural layer 38 including substrate 40 and tri-laminate layer 42 is formed.

Figure 8:
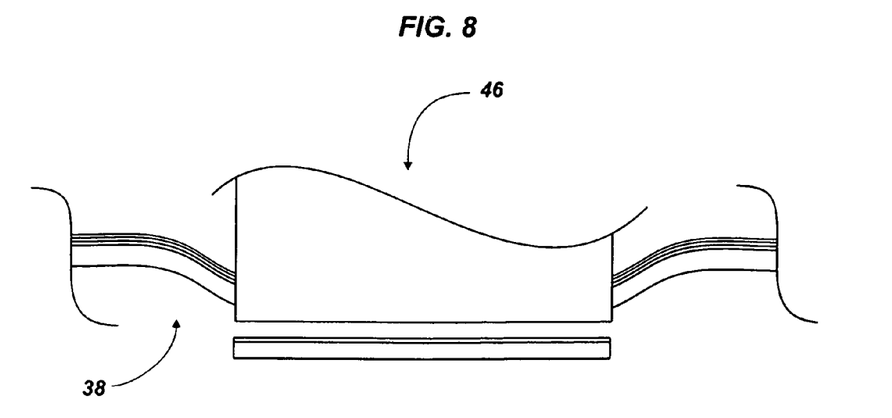
FIG. 8 is an illustrative view of a manufacturing stage for the first embodiment of the embossed manufacturing method according to the present invention, illustrating the punching of an opening.
Figure 9:
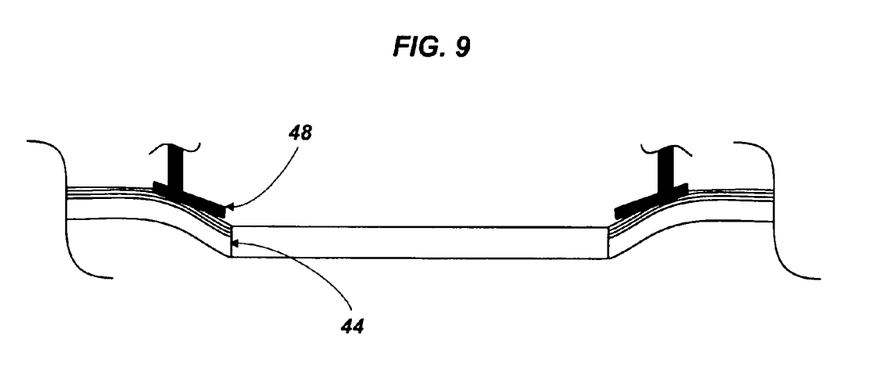
FIG. 9 is an illustrative view of a manufacturing stage for the first embodiment of the embossed manufacturing method according to the present invention, illustrating embossing.

Referring next to FIG. 8, the next step in the embossed manufacturing method includes punching of an opening 44 in structural layer 38 by means of tool 46. Those skilled in the art would appreciate in view of this disclosure that tool 46 may be any of a known variety of tools for constructing opening 44, without departing from the scope of the present invention. As shown in FIG. 9, the sloped area adjacent opening 44 may then be embossed by embossing head 48, which may be a heated tool, an ultra-sonic tool, or similar device producing heat or vibrations. As readily apparent to those skilled in the art, embossing head 48 may have the shape of an object (i.e. a defroster) being fitted within opening 44. Embossing head 48 may also be tuned for providing a tight fit.

For a specific example of the first embodiment of the embossed manufacturing method, embossing head 48 may include the operational properties described below.

Specifically, embossing head 48 may include a head engagement force sufficient enough to crush the foam layer (i.e. 1 Kg per cm of embossed perimeter, however more force would also be acceptable as needed). For the head heat cycling, the embossing head may be preferably heated to 315–335° F. (for material such as T.P.O.) at the initial moment of contact with the top layer of structural layer 38. Once head 48 contacts the top layer, head 48 may be held in contact with the material for a dwell time of 12 seconds and then cooled to approximately 190° F. (or less) prior to retracting.

In order to heat and cool embossing head 48 to the aforementioned temperature parameters, hot and cold oil (and other means know in the art) may be utilized. Specifically, a hot temperature controlled oil circuit (not shown) may be connected to each head by shifting a dedicated control valve for each particular head. Once a thermocouple (not shown) confirms the target temperature has been reached, head 48 may be advanced to contact the top layer of structural layer 38. After the required dwell time, each oil control valve may be shifted, thereby connecting the heads to a cool oil temperature controlled oil circuit. Further, after the thermocouple for head 48 indicates the required maximum retraction temperature has been reached, head 48 may be retracted from structural layer 38.

Generally, head 48 may be machined out of metal (i.e. Aluminum), with an exemplary thickness of approximately 12 mm so that sufficient volume would be provided for the drilling of an oil heating/cooling loop, which may be in the form of short flexible braided oil lines connecting each head to its oil control valve, thus minimizing the volume of oil to be flushed upon switching from heat to cooling for instance. The oil control valves may be piped to engage either oil from a hot temperature controlled circuit, or oil from a cool temperature controlled circuit. Head 48 may further be treated with TEFLON for a non-stick release.

Figure 10:
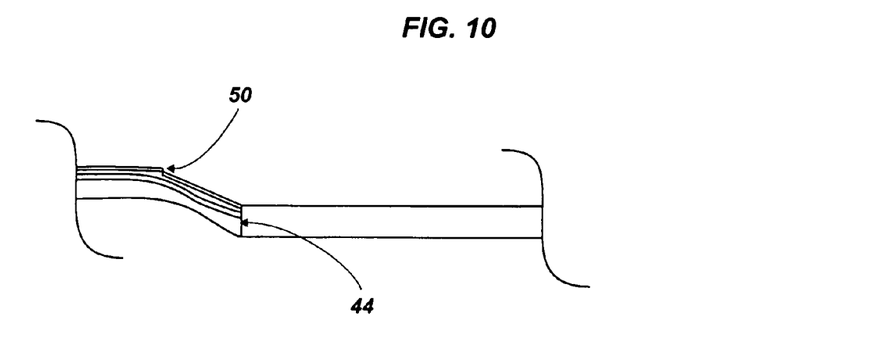
FIG. 10 is an illustrative view of a manufacturing stage for the first embodiment of the embossed manufacturing method according to the present invention, illustrating the resulting construction as embossed and punched.
Figures 11, 12:
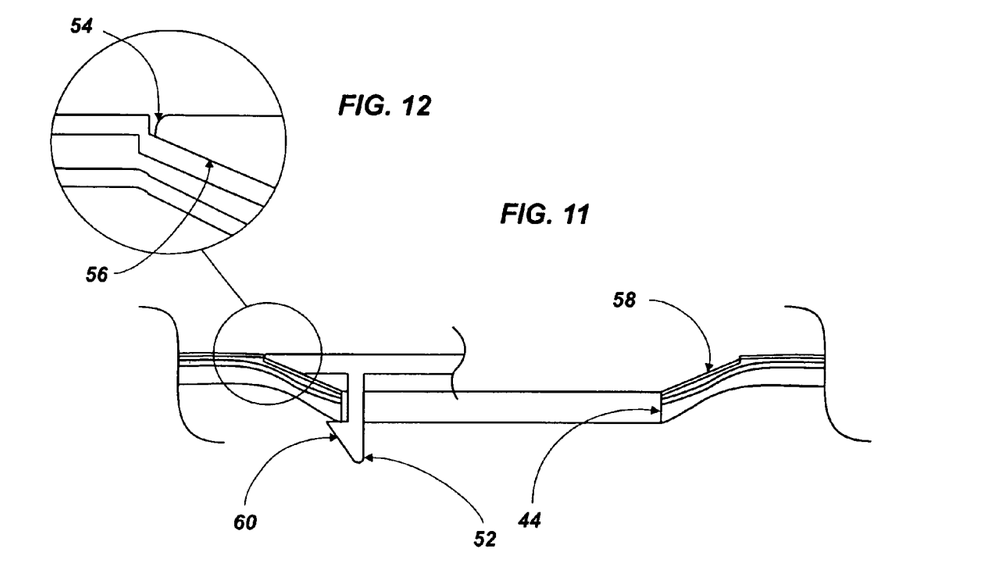
FIG. 11 is an illustrative view of a manufacturing stage for the first embodiment of the embossed manufacturing method according to the present invention, illustrating installation of an object, such as a side window defroster, in the opening.
FIG. 12 is an illustrative view of a manufacturing stage for the first embodiment of the embossed manufacturing method according to the present invention, illustrating an enlarged view of the area of contact between the object and the panel edge.
Figure 13:
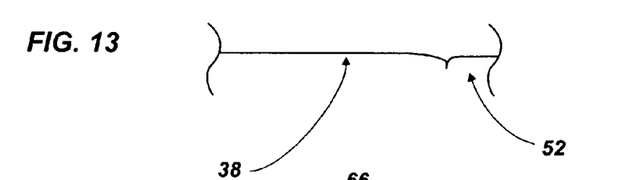
FIG. 13 is an illustrative view of a component interface with a main panel surface using the first and second embodiments of the embossed manufacturing method according to the present invention.

The completed embossed and punched construction is shown in FIG. 10, and includes a sharp edge feature 50. Referring next to FIGS. 11 and 12, an object 52 may be fitted within opening 44 and may include a small radius (i.e. 0.5 mm) at bezel 54, and further include sloped edge 56, the slope angle of which corresponds to the slope of surface 58 of structural layer 38. Object 52 may further include standard hooks 60 for retention thereof with structural layer 38.

Figure 1:
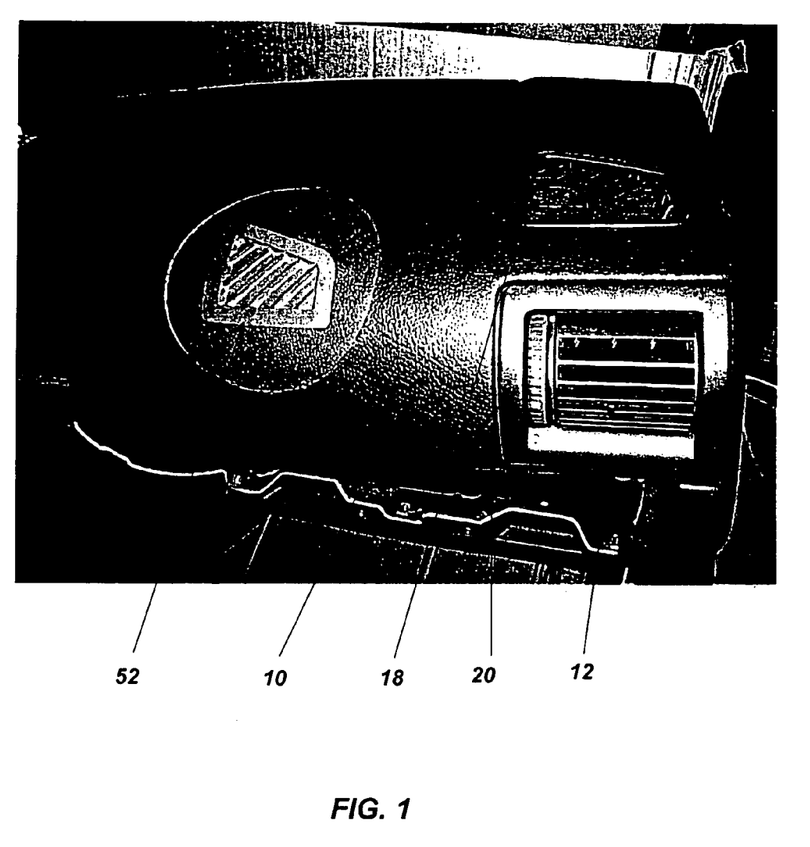
FIG. 1 is a photograph of an automobile instrument panel illustrative of the large radii visible in mating components (i.e. side interior and window defrosters) installed using conventional technology, including a comparative side window defroster installed on the instrument panel for a section thereof manufactured using the embossed manufacturing method according to the present invention.
Figure 2:
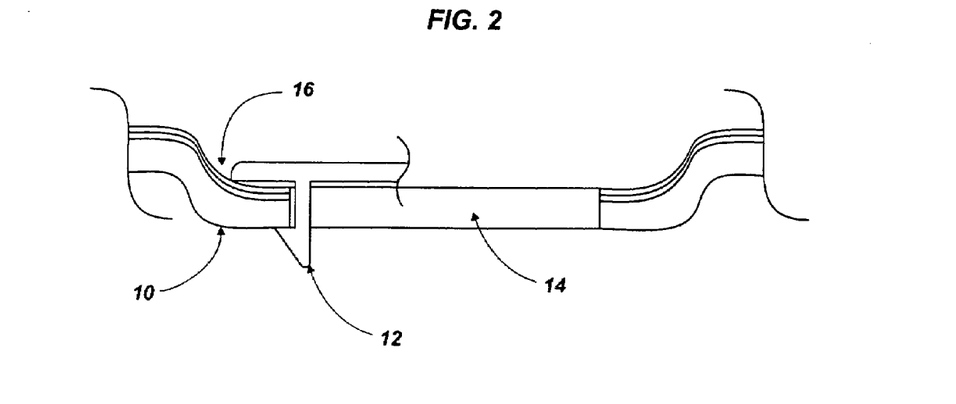
FIG. 2 is a view illustrating existing mold behind technology fit condition.
Figure 3A:
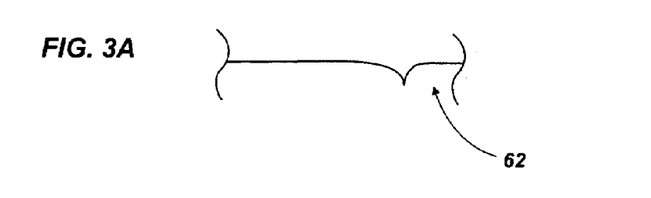
FIGS. 3A–3C are illustrative views of component interfaces with a main panel surface using conventional vacuum wrapping manufacturing procedures.
Figure 3B:
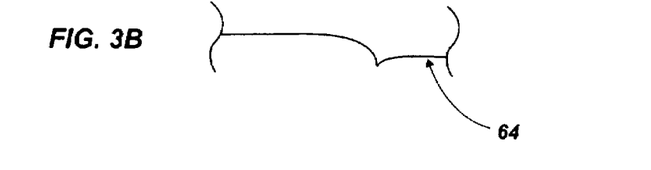
Figure 3C:
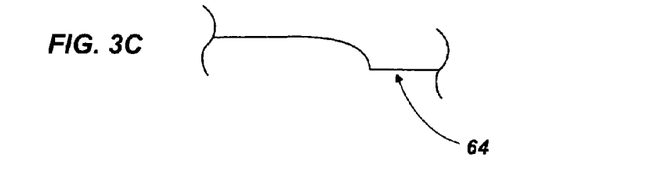

Thus referring to FIGS. 1, 2, 11 and 12, the embossed and punched construction according to the present invention thus allows installation of objects (i.e. side window defrosters) as shown to provide a high quality fit (very tight edge radii, small gaps and surface flushness), as compared to objects installed per existing mold behind or vacuum wrapped technology illustrated in FIGS. 3A–3C (see also object 52 in FIG. 1). Thus, referring to FIGS. 13–16, as discussed above with reference to FIGS. 11 and 12, the embossed and punched construction according to the present invention allows installation of objects 52, such as defrosters, speaker grills, arm rest attachments, handle modules, bins, buttons, lock bezels and control panels, to provide a high quality fit (very tight edge radii, gaps and flushness), as compared to objects installed per existing mold behind or vacuum wrapped technology illustrated in FIGS. 3A–3C.

Figure 14:
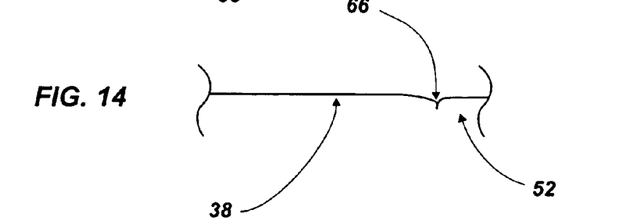
FIG. 14 is another illustrative view of a component interface with a main panel surface using the first and second embodiments of the embossed manufacturing method according to the present invention.
Figure 15:
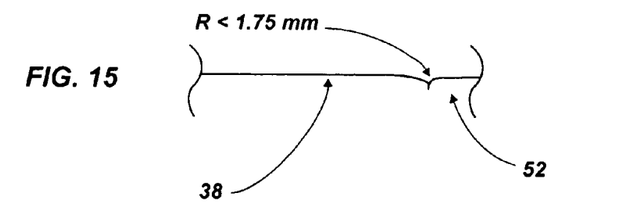
FIG. 15 is another illustrative view of a component interface with a main panel surface using the first and second embodiments of the embossed manufacturing method according to the present invention.
Figure 16A:
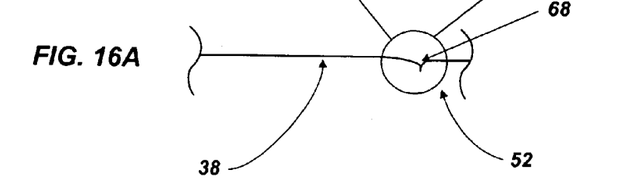
FIGS. 16A–16C are illustrative views of a component interface with a main panel surface using the first and second embodiments of the embossed manufacturing method according to the present invention, with FIGS. 16B and 16C illustrating enlarged views of the interface.
Figure 16B:
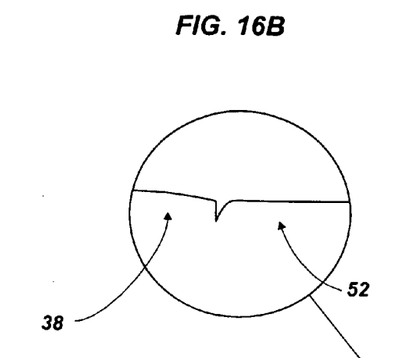
Figure 16C:
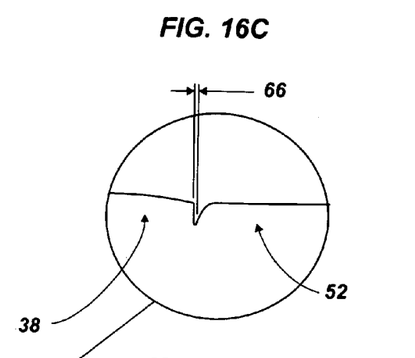

Specifically, compared to objects installed per existing mold behind or vacuum wrapped technology for which interfaces include excessively rounded joints having radii >2.5 mm and mating components, such as components 62, 64 are either raised above the interface (i.e. FIG. 3A, component 62) or well below the main panel surface (i.e. FIG. 3B or 3C, component 64), the embossed manufacturing method according to the present invention provides an interface with a much tighter fit appearance. For example, referring to FIGS. 13–16, for the embossed manufacturing method according to the present invention, panel interfaces include well formed rounded joints having radii <0.5 mm, and gaps between various components are extremely tight. As shown in FIGS. 14 and 15, the bezel edge radius is <1.75 mm. As shown in FIGS. 16A–16C, the manufacturing method according to the present invention thus delivers a panel edge interface radius 68 of <0.5 mm and a gap 66 of <0.125 mm.

Thus, the embossed manufacturing method according to the present invention delivers extremely tight radii at the edge areas for allowing the surface of an installed object to made flush with the panel structure in a cost-effective and efficient manufacturing procedure outlined above.

The second embodiment of the embossed manufacturing method according to the present invention will now be described in detail with reference to FIGS. 17–21.

Figure 17:
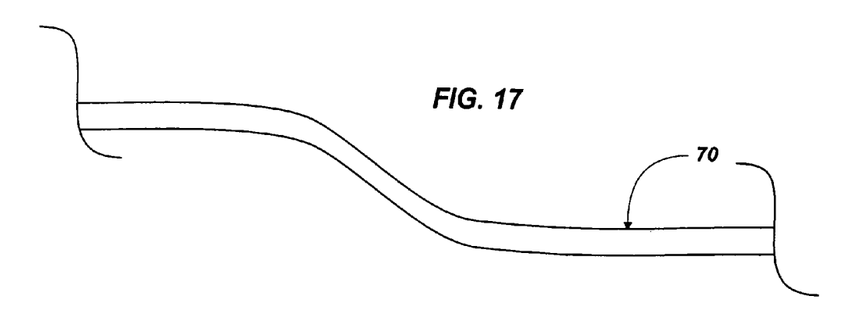
FIG. 17 is an illustrative view of a manufacturing stage for the second embodiment of the embossed manufacturing method according to the present invention, illustrating an injection molded foundation which is vacuum wrapped with a bi-laminate (sandwiched skin and foam) preform.
Figure 18:
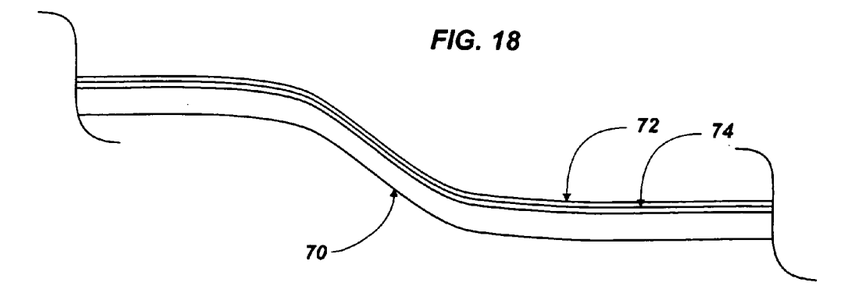
FIG. 18 is an illustrative view of a manufacturing stage for the second embodiment of the embossed manufacturing method according to the present invention, illustrating the injection molded foundation vacuum wrapped with a bi-laminate preform.

Specifically, as shown in FIGS. 17 and 18, the first step in the second embodiment of the embossed manufacturing method may include the use of injection molded foundation 70, which may then be vacuum wrapped (as opposed to the injection molded construction of the first embodiment) with two or three layers of grained decorative laminates 72, 74. At least one of the layers 72, 74 may be a soft (foamed) product for providing an adequate resilience and softness to the instrument panel or other component being manufactured. Further, laminates 72, 74 may be of similar construction as layers 24, 28 discussed above for the first embodiment.

Figure 19:
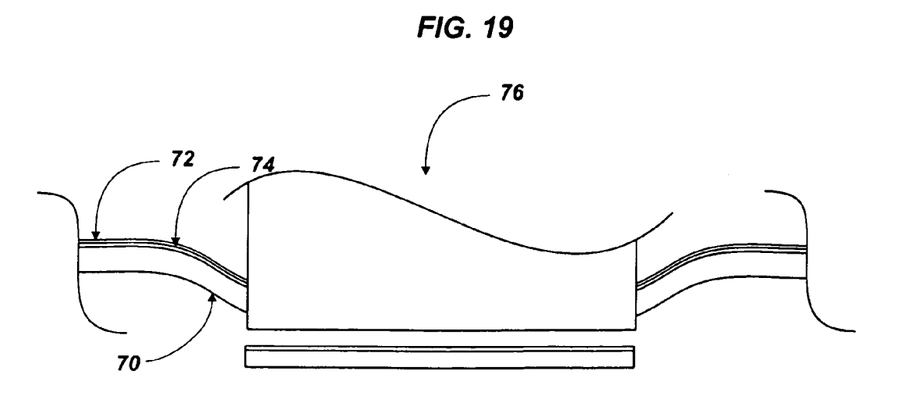
FIG. 19 is an illustrative view of a manufacturing stage for the second embodiment of the embossed manufacturing method according to the present invention, illustrating the punching of an opening.
Figure 20:
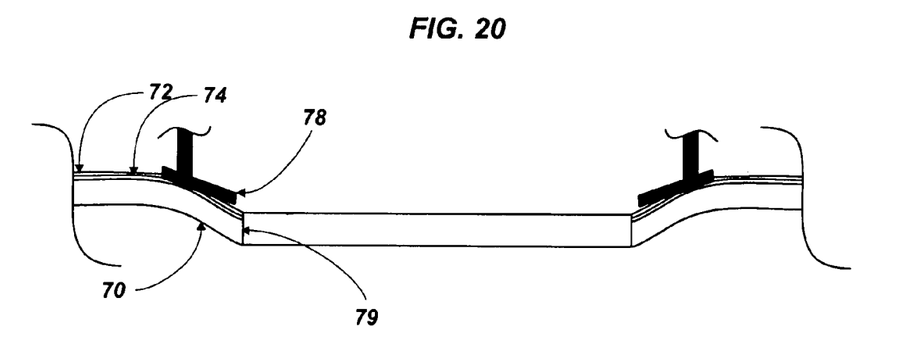
FIG. 20 is an illustrative view of a manufacturing stage for the second embodiment of the embossed manufacturing method according to the present invention, illustrating embossing.
Figure 21:
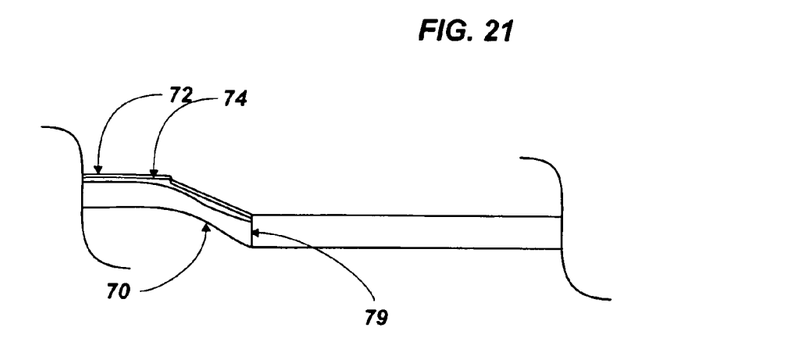
FIG. 21 is an illustrative view of a manufacturing stage for the second embodiment of the embossed manufacturing method according to the present invention, illustrating the resulting construction as embossed and punched.

As with the first embodiment, the vacuum wrapped structure of FIG. 18 may then be punched by means of tool 76 (or otherwise cut) to produce an opening 79 as shown in FIG. 19, and thereafter embossed by means of tool 78 as shown in FIG. 20. The resulting embossed and punched construction is shown in FIG. 21. Embossing tool 78 of FIG. 20 may be tuned for providing a tight fit.

For a specific example of the second embodiment of the embossed manufacturing method, embossing tool 78 may include the operational properties described below.

Specifically, embossing tool 78 may include a head engagement force sufficient enough to crush the foam layer (i.e. 1 Kg per cm of embossed perimeter, however more force would also be acceptable as needed). For the head heat cycling, the embossing head may be preferably heated to 315–335° F. (for material such as T.P.O.) at the initial moment of contact with the top layer of the structural layer. Once tool 78 contacts the top layer, tool 78 may be held in contact with the material for a dwell time of 12 seconds and then cooled to approximately 190° F. (or less) prior to retracting.

In order to heat and cool embossing tool 78 to the aforementioned temperature parameters, hot and cold oil (and other means know in the art) may be utilized. Specifically, a hot temperature controlled oil circuit (not shown) may be connected to each head by shifting a dedicated control valve for each particular head. Once a thermocouple (not shown) confirms the target temperature has been reached, tool 78 may be advanced to contact the top layer of the structural layer. After the required dwell time, each oil control valve may be shifted, thereby connecting the heads to a cool oil temperature controlled oil circuit. Further, after the thermocouple for tool 78 indicates the required maximum retraction temperature has been reached, tool 78 may be retracted from the structural layer.

Generally, tool 78 may be machined out of metal (i.e. Aluminum), with an exemplary thickness of approximately 12 mm so that sufficient volume would be provided for the drilling of an oil heating/cooling loop, which may be in the form of short flexible braided oil lines connecting each head to its oil control valve, thus minimizing the volume of oil to be flushed upon switching from heat to cooling for instance. The oil control valves may be piped to engage either oil from a hot temperature controlled circuit, or oil from a cool temperature controlled circuit. Tool 78 may further be treated with TEFLON for a non-stick release.

As discussed above for the first embodiment and illustrated in FIGS. 11 and 12, an object 52 fitted within opening 79 may include a small radius (i.e. <0.5 mm) at the bezel thereof. Thus referring to FIGS. 2, 3A–3C, 11 and 12, the embossed and punched construction according to the second embodiment of the embossed manufacturing method thus allows installation of objects as shown to provide a high quality fit (very tight edge radii, small gaps and surface flushness), as compared to objects installed per existing mold behind or vacuum wrapped technology illustrated in FIGS. 3A–3C (see also object 52 in FIG. 1). Thus, referring to FIGS. 13–16, as discussed above with reference to FIGS. 11 and 12, the embossed and punched construction according to the present invention allows installation of objects, such as defrosters, speaker grills, arm rest attachments, handle modules, bins, buttons, lock bezels and control panels, to provide a high quality fit (very tight edge radii, gaps and flushness), as compared to objects installed per existing mold behind or vacuum wrapped technology illustrated in FIGS. 3A–3C.

Specifically, compared to objects installed per existing mold behind or vacuum wrapped technology for which interfaces include excessively rounded joints having radii >2.5 mm and mating components, such as components 62, 64 are either raised above the interface (i.e. FIG. 3A, component 62) or well below the main panel surface (i.e. FIG. 3B or 3C, component 64), the embossed manufacturing method according to the present invention provides an interface with a much tighter fit appearance. For example, referring to FIGS. 13–16, for the embossed manufacturing method according to the present invention, panel interfaces include well formed rounded joints having radii <0.5 mm, and gaps between various components are extremely tight. As shown in FIGS. 14 and 15, the bezel/adjoining panel radius is <1.75 mm. As shown in FIGS. 16A–16C, the manufacturing method according to the present invention thus delivers a panel interface radius 68 of <0.5 mm and a gap 66 of <0.125 mm., In summary, the first and second embodiments of the embossed manufacturing method according to the present invention delivers extremely tight radii at the edge areas for allowing the surface of an installed object to be made flush with the panel structure in a cost-effective and efficient manufacturing procedure as outlined above, regardless of whether, for example, the instrument panel structure is formed in by means of injection molding or vacuum wrapping.

While the first and second embodiments of the embossed manufacturing sequences described above have been used to discuss the manufacture of an instrument panel, it should be understood that the embossed manufacturing sequence may also be used for door liner openings (for speaker grills, arm rest attachments, handle modules, bins, buttons, lock bezels and control panels), and door liner edge details in exactly the same manner, and for a variety of other components for automobiles and other transportation means such as boats, aircraft and the like.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method of producing tight bezel fits between automotive interior panels and their mating subcomponents, said method comprising:
   vacuum wrapping over a substrate layer to form a vacuum wrapped automotive interior panel;
   forming an opening in said vacuum wrapped automotive interior panel; and
   embossing said vacuum wrapped automotive interior panel adjacent a perimeter of said opening to produce an embossed interface between said vacuum wrapped automotive interior panel and a mating subcomponent installed in the opening, thereby producing a tight bezel fit between said vacuum wrapped automotive interior panel and the mating subcomponent installed in the opening.

2. A method according to claim 1, wherein a wrap used for said vacuum wrapping is a multi-layer laminate preform.

3. A method according to claim 2, wherein said multi-layer laminate preform includes a skin layer and a foam-layer.

4. A method according to claim 1, wherein said vacuum wrapped automotive interior panel includes a sloped section adjacent said embossed interface to permit an outer surface of the mating subcomponent to lay flush relative to an outer surface of said vacuum wrapped automotive interior panel.

5. A method according to claim 1, wherein said opening is formed by punching or cutting.

6. A method according to claim 1, wherein said embossing tool is one of a heated tool and an ultra-sonic tool.

7. A method according to claim 1, wherein said embossing step provides an interface radius of less than approximately 0.5 mm.

8. A method according to claim 1, wherein for said embossing step, a gap between an edge of said embossed interface and the mating subcomponent installed in the opening is less than approximately 0.125 mm.

* * * * *